O. B. ANDREWS.
DISINFECTING NEST.
APPLICATION FILED DEC. 4, 1916.
1,216,766.
Patented Feb. 20, 1917.
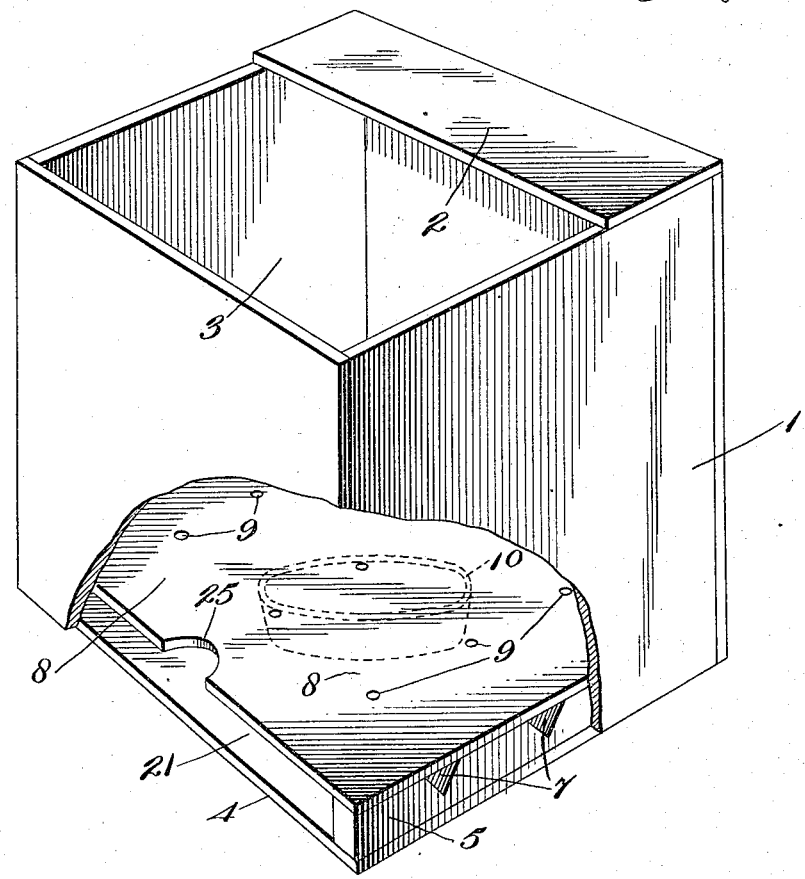
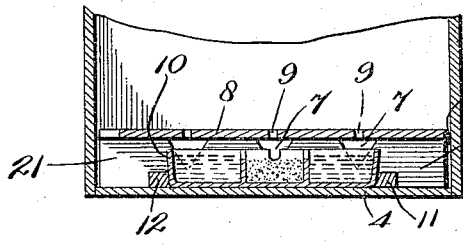
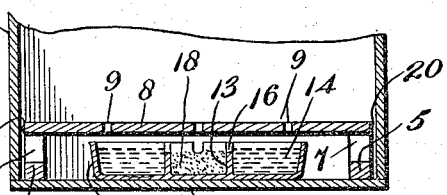
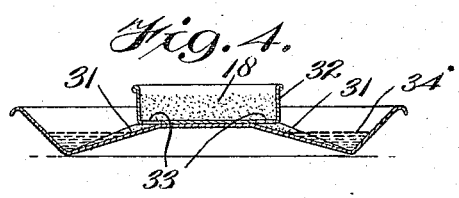
Inventor
Oliver B. Andrews, by
T. A. Witherspoon
Attorney
THE NORRIS PETERS CO., PHOTO-LITHO., WASHINGTON, D. C.

UNITED STATES PATENT OFFICE.

OLIVER B. ANDREWS, OF CHATTANOOGA, TENNESSEE.

DISINFECTING-NEST.

1,216,766.  Specification of Letters Patent.  Patented Feb. 20, 1917.

Application filed December 4, 1916. Serial No. 134,953.

*To all whom it may concern:*

Be it known that I, OLIVER B. ANDREWS, a citizen of the United States, residing at Chattanooga, in the county of Hamilton and State of Tennessee, have invented certain new and useful Improvements in Disinfecting-Nests; and I do hereby declare the following to be a full, clear, and exact description of the invention, such as will enable others skilled in the art to which it appertains to make and use the same.

This invention relates to disinfecting cases for fowls and has for its object to provide a nest of this character which will be simple in construction, comparatively inexpensive to manufacture and one which will be unusually efficient in action.

With this object in view the invention consists in the novel details of construction and combinations of parts more fully hereinafter disclosed and particularly pointed out in the claim.

Referring to the accompanying drawings forming a part of this specification in which—

Figure 1 is a perspective view of a nest made in accordance with the invention;

Fig. 2 is a detail sectional view showing the bottom of the nest and one form of disinfecting receptacle in place;

Fig. 3 is a view similar to Fig. 2 showing the parts from a direction at right angles to that from which Fig. 2 is seen and Fig. 4 is a sectional view of a modified form of disinfectant holder.

1 indicates any suitable nest construction, but preferably of rectangular form and provided with a partial cover such as 2, leaving an opening 3 for the entrance of the fowl. The body portion 1 is preferably closed on four sides as shown and is provided with a bottom 4 on which rests the ledges 5 and 6 and which ledges are provided with the V-shaped holes 7 as shown. Extending across the nest between the ledges 5 and 6 is the false bottom 8 provided with the perforations 9 to facilitate the escape of the disinfecting fumes or vapors that escape from the receptacle 10 which is located between the true bottom 4 and the false bottom 8. The said bottom 4 is preferably provided with the ledge or holding pieces 11 and 12 between which the said receptacle 10 rests. The said receptacle 10 may be provided with a central powder holding receptacle 13 and an annular space 14 for the accommodation of a liquid. The said receptacle 13 is suitably perforated as at 16 to permit the passage of the liquid to and from the receptacle 13 or the passage of the powdered material 18 to the space 14.

The false bottom 8, as well as the supporting ledge members 5 and 6 are made of dimensions smaller than the interior of the nest 1, so as to leave a space 20 on all sides between the outer surfaces of the false bottom and the inner surfaces of the nest 1.

This said space 20 in connection with the orifices 7 and the open spaces 21 between the extreme ends of the members 5 and 6 serves to permit a ready escape of the fumes or vapors of the disinfectant 18 and thus to insure a thorough permeation of the material of the nest with the disinfectant, thereby insuring that the nest will always be free from mites and other vermin. Of course the orifices 9 are also of the greatest assistance in permitting the said fumes to not only permeate up through the material of the nest, but to also permeate the feathers of the hen while on the nest and thus even facilitate the killing of vermin on the body of the hen.

One edge of the false bottom 8 is cut away as at 25 so as to facilitate the ready removal, as well as the replacement of the false bottom 8 inside the body portion 1, and said hole 25 further aids in permitting the vapor fumes to permeate the material of the nest and the atmosphere surrounding the hen. In Fig. 4 is illustrated a somewhat modified form of disinfectant container, consisting of the reversely bent dish portion 30 provided with the channels 31 and the central container 32 having the holes 33 leading into said channels 31. A liquid such as 34 is accommodated in the annular space below the receptacle 32, and receives the powdered material 18 through said holes 33 and channels 31.

What I claim is:

In a disinfecting nest the combination of a main body portion provided with a bottom, a disinfectant receptacle adapted to rest on said bottom; means for holding said receptacle on said bottom; a false bottom provided with a cutaway portion to facilitate its ready removal and replacement and with a plurality of disinfectant conducting openings; a pair of strips provided with disinfectant conducting openings adapted to hold said false bottom at a predetermined distance above said disinfectant receptacle, said false bottom and said strips being of dimensions less than the interior of the main body portion of the nest to provide a disinfectant conducting annular space around the exterior of said false bottom communicating with the openings in said strips; and a strip on the top to partially close the entrance to said nest, substantially as described.

In testimony whereof I affix my signature, in presence of two witnesses.

OLIVER B. ANDREWS.

Witnesses:
M. G. HOPER,
A. O'CONNELL.

Copies of this patent may be obtained for five cents each, by addressing the "Commissioner of Patents, Washington, D. C."